United States Patent [19]

Roberts et al.

[11] 3,870,825

[45] Mar. 11, 1975

[54] TIME-DIVISION MULTIPLEX COMMUNICATION SYSTEM

[75] Inventors: Robert C Roberts; Edward B. Alcorn, both of Lexington, Ky.

[73] Assignee: Engineered Devices Company, Lexington, Ky.

[22] Filed: Jan. 5, 1973

[21] Appl. No.: 321,394

[52] U.S. Cl....... 179/15 AL, 340/152 R, 179/15 BS

[51] Int. Cl............................................... H04j 3/08

[58] Field of Search.......... 179/15 A, 15 AT, 15 BS, 179/15 AL, 15 BY, 1 B; 178/69.5 R; 340/152 R

[56] References Cited

UNITED STATES PATENTS

| | | | |
|---|---|---|---|
| 3,377,619 | 4/1968 | Marsh | 340/152 R |
| 3,544,976 | 12/1970 | Collins | 179/15 AL |
| 3,566,038 | 2/1971 | Slavin | 179/1 B |
| 3,691,528 | 9/1972 | Calvagna | 340/152 R |

*Primary Examiner*—Ralph D. Blakeslee

*Attorney, Agent, or Firm*—Wood, Herron & Evans

[57] ABSTRACT

A time-division multiplex system including multiple transmitters and receivers; a master clock cyclically generating once per clock frame a series of different clock numbers in the form of differing sequences of binary signals, each clock number constituting a different time slot; a clock highway interconnecting the transmitters and receivers and to which the clock number signals are applied; a comparison network at each transmitter and receiver which sequentially compares the clock number signals on the clock highway with a number at the transmitter and receiver for the purpose of selecting the time slot during which each transmitter and receiver operates to transmit and receive audio information, respectively, over an audio information highway which also interconnects the transmitters and receivers.

15 Claims, 4 Drawing Figures

PATENTED MAR 11 1975 3,870,825

SHEET 1 OF 3

TIME-DIVISION MULTIPLEX COMMUNICATION SYSTEM

Also included is a reset signal generator at each transmitter for applying a reset signal to a reset highway, which interconnects all transmitters and receivers, during the time slot associated with that transmitter when the latter has concluded an audio information transmission, and a reset highway sampling circuit at each receiver for sampling the reset highway during the time slot associated with that receiver for the purpose of controlling the operation of the receiver when a transmission being received by that receiver has terminated.

The receivers also include a demand signal generator for applying to a demand highway, which interconnects all transmitters and receivers, a demand signal during the time slot associated with the transmitter from which the receiver wishes to obtain information, and a demand highway sampling circuit at each transmitter which samples the demand highway during a specified time slot associated with that transmitter for initiating the transmission of audio information in response to a call from the receiving station which has issued the demand signal.

Also included is a single seizure circuit at each transmitter for applying to a single seizure highway, which interconnects all transmitters and receivers, a single seizure signal during the time channel associated with the transmitter when that transmitter is in the process of transmitting audio information, and a single seizure highway sampling circuit at each receiver for sampling the single seizure highway during the time slot associated with that receiver, whereby a receiver which calls a transmitter which is already transmitting will be precluded from receiving the transmission from the previously called and still transmitting transmitter.

In a preferred form, the audio information highway includes $m$ separate highways which are each connected to different groups of $n$ transmitters. If the highest information frequency of the audio information is f, this permits a transmitter to transmit m information samples per clock frame with the result that the information may be transmitted without loss using a clock generator generating clock numbers at a rate correlated to 2fn/m.

This invention relates to multi-station communication systems, and more particularly to such systems which operate on the time-division multiplex principle.

Multi-station communication systems are being utilized with increasing frequency in the educational field, particularly in areas where emphasis is placed on individualizing student instruction to meet the peculiar needs of different students having varying learning rates and varying subject matter interests. For example, in the instruction of foreign languages where students often progress at different rates, communication systems have been provided, susceptive of classroom use, which afford the opportunity to each student to reproduce in the classroom and on an individual basis, such as via a set of headphones, a variety of different foreign language instructional programs, the programs being transmitted in the classroom simultaneously from a multi-channel classroom-located transmitter, usually of the AM or FM type. In such case, each student headset has associated with it a multi-channel receiver which is tunable to the frequency of the channel carrying the transmission which the student desires to hear. In more recent years, systems of this type have been of the "wireless" type in the sense that "hard-wiring" between the multi-channel transmitter and the individual receivers is unnecessary.

In practice, systems of the type described have a number of limitations. For example, due to limitations on transmitting power imposed by the Federal Communications Commission, systems of the wireless type have customarily been restricted to transmission and reception within a single classroom. Such systems have also been limited in another important respect, namely, in the number of channels, and hence the number of different instructional programs, which can be simultaneously transmitted by a single system. Thus the student is provided with a limited choice of instructional material. A further limitation of the classroom type systems is that the individual channel transmitters are not normally under the control of the students, and it is therefore usually necessary to simultaneously transmit on all channels even though at any given time no student may be interested in receiving a transmission from a particular one or more of the channels.

It has now been proposed to expand the use of multichannel communication systems for education purposes to the point where a large-scale central store of different educational programs, for example, 1,000 or more in number, is provided at some remote location with the programs being selectively accessible to a large number of students located at different receiving stations which are both widely scattered with respect to each other as well as remote from the central store of program material. Because of the shortcomings of the previously described classroom-type systems, the approaches utilized in connection with these latter type multi-channel systems have not been useful in the design of a large-scale system of the type noted.

Accordingly, it has been an objective of this invention to provide a multi-channel educational communication system for enabling a plurality of students located at different receiving stations to select, for transmission by a central facility and individual reception at the student receiving station, a particular one of a large number of instructional programs stored at the central station. This objective has been accomplished in a preferred embodiment incorporating certain principles of this invention by providing (a) a plurality of transmitters and receivers, each of which are connected to a clock highway to which a clock number generator applies sequentially generated clock number signals at a rate per clock frame at least equal in number to the number of transmitters, and (b) a clock number recognition circuit at each transmitter which recognizes receipt thereat of a clock number uniquely associated with that transmitter and in response thereto transmits information samples in predetermined time relation to receipt thereat of its associated clock signal, and (c) a recognition circuit at each receiver which recognizes the clock number associated with a transmitter from which it is desired to receive a transmission at that receiver and in response thereto samples an audio highway interconnecting the transmitters and receivers and on which the information samples are applied by the desired transmitter, for the purpose of reproducing at that receiver the information sent by the called transmitter.

A very definite advantage of the foregoing approach, providing there are more clock numbers, or time channels, than transmitters, is that by merely changing the clock number associated with a given transmitter, a new educational program having a call number corresponding to that of the changed clock number may be added to the central store of available information without changing the call number of the instructional program which has been replaced. In this manner, the educational program which has been replaced, although no longer available for transmission to a student receiving station, nevertheless retains its unique identifying call number 12-137 at some future date may be reinserted into this or a different transmitter and made available to all students by merely changing back the identifying number of the transmitter into which it is placed to correspond to that of the reinserted educational program. Stated differently, the foregoing feature would allow a system to use more instructional programs that there are transmitters, with the result that call numbers of specified instructional programs need not be changed as they are switched into and out of the system; the only thing that changes is their availability status, i.e., available or unavailable.

Another advantage of the foregoing feature of the invention is that it permits the system to be readily increased in size, for example, by adding another transmitter, without disrupting the whole system. As long as there are more clock numbers than there are transmitters in the system, another transmitter can be added by merely connecting it to the clock and audio highways, and setting its recognition circuit to respond to an unused clock number to which it is assigned.

In accordance with a further aspect of the invention, the receivers are provided with demand signal generators responsive to the output of the receiver recognition circuits for applying to a demand highway, which interconnects all the receiving and transmitting stations, a demand signal in predetermined time relation to the clock number associated with the calling receiver station. Additionally, each transmitter is provided with a demand highway sampling circuit responsive to its recognition circuit for sampling the demand highway to detect the presence of a demand pulse during the time channel associated with that transmitter, and which in response to detection of such a demand pulse operates to initiate a transmission. The tranmission continues so long as the demand pulse is received at the transmitter, which in turn continues so long as the receiver desires to obtain information from that transmitter. Thus, in accordance with this aspect of the invention the receivers control the initiation of, and continued transmission by, a specified transmitter.

In accordance with a further aspect of the invention the transmitters are provided with reset signal generators for generating a reset signal at the conclusion of a transmission. The reset signal is applied to a reset highway, which is connected to all the transmitting and receiving stations, in predetermined time relation to the receipt at that transmitter of its associated clock signal. Additionally, each receiver is provided with a reset highway sampling circuit for sampling the reset highway upon receipt at that receiver of the clock number signal corresponding to the identifying number of the transmitter called by that receiver. Upon detection of the reset signal, a control function is executed at the receiver to terminate its operation, including termination of demand signals.

In accordance with a still further aspect of the invention, a seizure circuit is provided at the transmitter for applying a seizure signal to a single seizure highway, which interconnects all transmitters and receivers, once per clock frame while the transmitter is in operation. The signal seizure signal is applied to the seizure highway in predetermined time relation to receipt at the transmitter of its associated clock number signal. Additionally, at the receiver a single seizure highway sampling circuit is provided which samples the single seizure highway in predetermined time relation to receipt at the receiver of the clock pulse corresponding to the transmitter called by that receiver. If, during the sampling operation, a single seizure signal is detected, a control function is executed at the receiver indicating that the called transmitter is in use for preventing the receiver from sampling the data highway and receiving the transmission from the called transmitter, which transmitter was previously called by another receiver and is still transmitting to that other receiver. By virtue of this aspect of the invention, control of a transmitter is not interrupted by a receiver which calls a transmitter already in use.

In accordance with another and equally important aspect of the invention, multiple information highways are used, for example, ten highways. The information highways are each connected to different groups of transmitters, for example, each audio highway being connected to a different group of 100 transmitters in a 1,000 transmitter system. A called transmitter transmits ten information samples per clock frame over its respective information highway, and the calling receiver which selectively connects to this highway receives all ten samples each clock frame. Assuming the maximum frequency of the information being transmitted is 25 kHz, this arangement permits the information to be transmitted without loss using a 5 mHz clock number frequency rate. This is in contrast to the clock number frequency rate of 50 mHz which would ordinarily be necessary were only a single audio highway utilized.

In accordance with a further feature of this invention all highways follow substantially the same physical path in routing from transmitters to receivers. As a consequence, data, reset and single seizure signals applied to their associated highways by a transmitter in predetermined time realtion to receipt thereat of the corresponding clock signal remain synchronized with that clock signal as the data, reset and single seizure signals travel down their associated highways to the receivers. This simplifies the sampling operation at the receiver in that each of the data, reset, and single seizure highways can be sampled to detect the presence of data, reset and single seizure signals from a called transmitter in response to receipt at that receiver of the clock signal associated with the called transmitter.

In similar fashion, demand signals issued by a receiver travel down the demand, or calling, highway in synchronism with the clock number signal associated with the transmitter called by the receiver, thereby simplifying sampling of the calling highway at the called transmitter upon receipt thereat of a clock number signal bearing a predetermined relation to that associated with the transmitter being called.

The synchronism between the demand signal and associated clock number is further enhanced by incorporating in the system a delay circuit in the calling highway between receivers, which are grouped, and the transmitters, which are also grouped. The delay circuit stores a demand signal issued by a calling receiver until the next successive clock number is issued by the clock number generator, whereupon the demand signal is released in synchronism with the clock number and remains in synchronism therewith as it travels down the calling highway to the transmitters. Assuming, for example, that the total propagation delay of the calling highway is between three and four time slots, the demand signal would be released by the delay circuit in synchronism with a clock number signal occurring four time slots after the clock number associated with the calling receiver which generated the demand signal. By sampling the demand highway at the transmitter four time slots after receipt thereat of the clock number assigned to that transmitter, demand for that transmitter can be easily and reliably ascertained.

These and other advantages and features of the invention will become more readily apparent from a detailed description of the drawings in which.

Figure 1A:
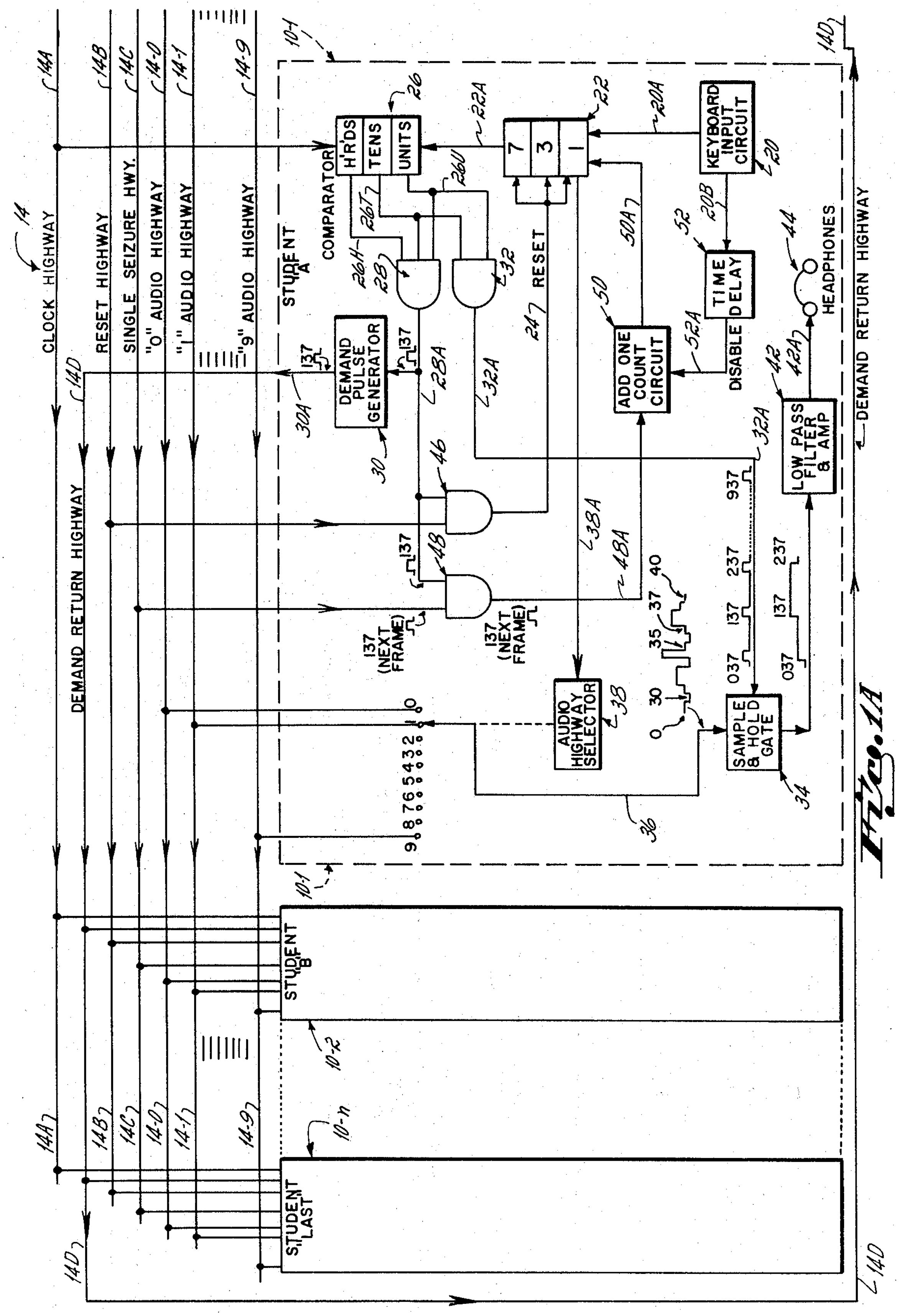
FIGS. 1A and 1B are schematic circuit diagrams in block format of certain portions of the system of this invention, and collectively depict the entire system.
Figure 1B:
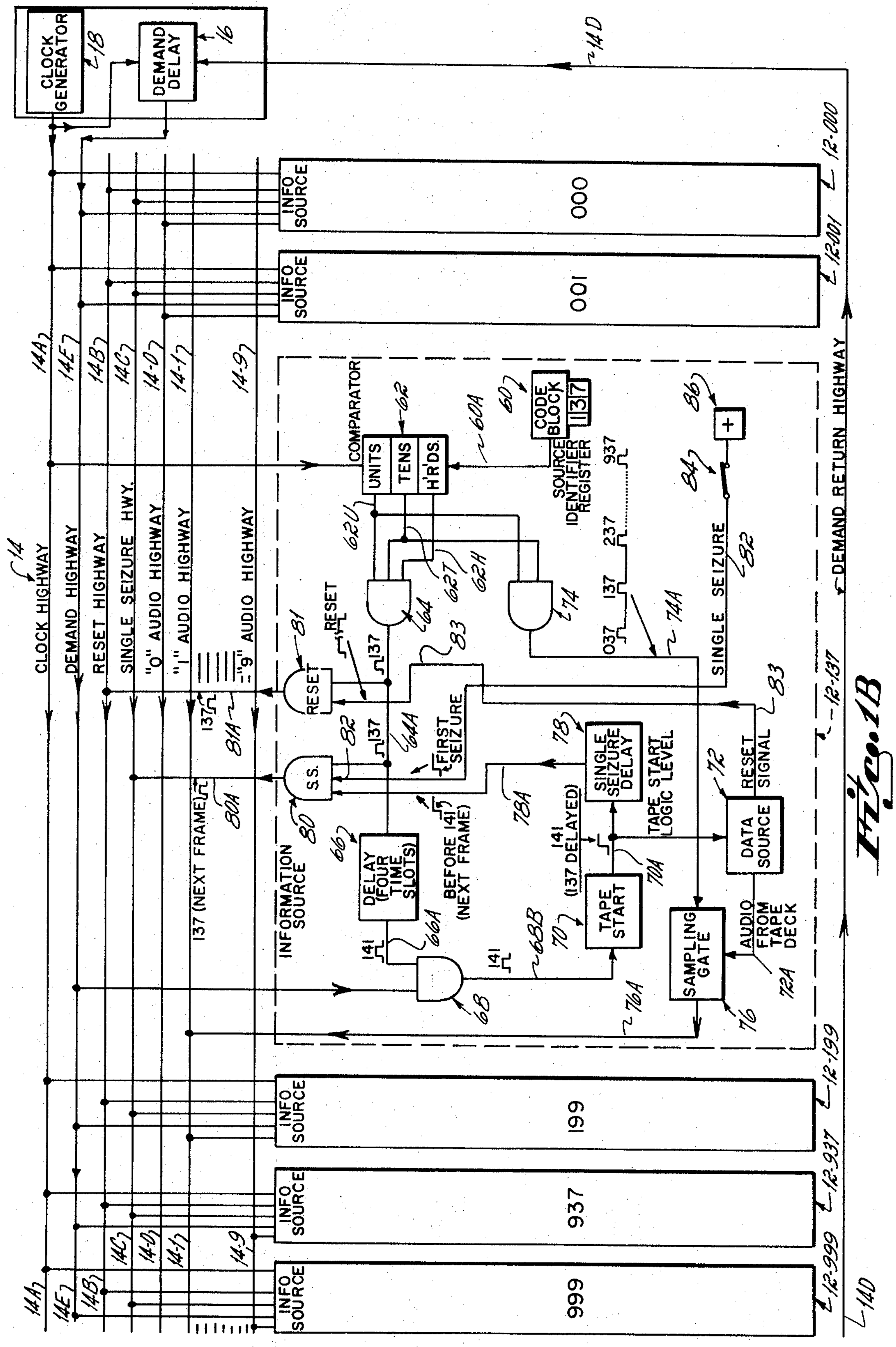

The audio information retrieval system, with particular reference to FIG. 1, includes a plurality of student stations 10-1, 10-2, . . . 10-*n*, and a plurality of information sources 12-000, 12-001, . . . 12-999 of which sources 12-000, 12-001, 12-137, 12-199, 12-937, and 12-999 are shown in block format with the circuit components thereof being shown only for source 12-137. Preferably, sources 12-000, . . . 12-999 store audio information which is transmitted on demand to one or more student stations. Interconnecting the student stations 10-1, 10-2, . . . 10-*n* and the information sources 12-000, 12-001, . . . 12-999 are a group of communication links or highways 14. These highways include a clock highway 14A, a reset highway 14B, and a seizure highway 14C, each of which are connected in common to all student stations 10-1, 10-2, . . . 10-*n* and all information sources 12-000, 12-001, . . . 12-999. The highways 14 further include a demand return highway 14D connected in common to all student stations 10-1, 10-2, . . . 10-*n*, and a demand highway 14E connected in common to all information sources 12-000, 12-001, . . . 12-999. The demand return highway 12D and the demand highway 12E are interconnected with each other via a demand delay circuit 16 which is controlled by clock signals on the clock highway 14A provided by a clock generator 18 to which the clock highway is connected, all for reasons to become apparent hereafter. Also interconnecting the student stations 10-1, 10-2, . . . 10-*n* and the information sources 12-000, 12-001, . . . 12-999, and included in the group of communication links or highways 14, are ten audio highways 14-0, 14-1, . . . 14-9. These audio highways are each connected in common to each of the student stations 10-1, 10-2, . . . 10-*n*, while audio highways 14-0, 14-1, . . . 14-9 are connected to information sources 12-000 through 12-099, 12-100 through 12-199, . . . 12-900 through 12-999, respectively. Unless one or more of the ends of the highways 14A, 14B, 14C, 14D, 14E, and 14-0 through 14-9 are described as being connected to a circuit, such as the clock highway 14A being connected to the clock generator 18 at one end thereof, the highways are terminated in impedances matching the characteristic impedance of the highway. In this manner, signals traveling down the highways, which are preferably coaxial cables, will not be reflected back along the highway in the opposite direction, but rather will be absorbed by these highway-terminating impedances.

Figure 3:
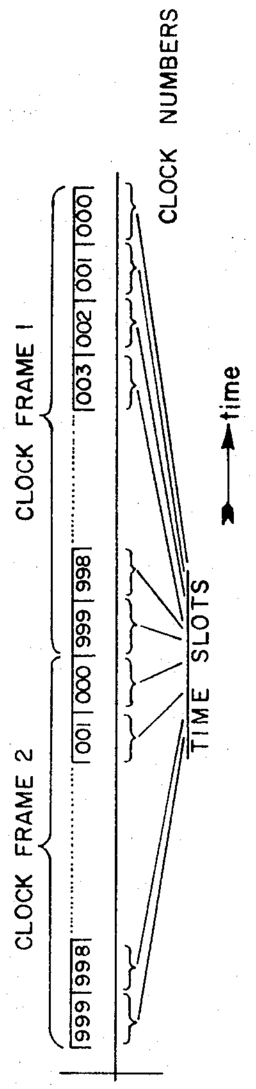
FIG. 3 is a plot of amplitude versus time of the clock number signals output from the clock number generator.

As shown schematically in FIG. 3, the clock generator 18, the output of which is connected to one end of the clock bus 14A, provides to the clock bus end to which it is connected, signals representative of clock numbers 000, 001, . . . 999 at a clock number rate of 5 mHz. Each signal sequence of one thousand successive clock numbers 000, 001, . . . 999 constitutes one clock frame 1, 2, . . . Since one thousand clock numbers constitute a clock frame, and since the individual clock numbers are issued at a frequency of 5 mHz, the clock frames 1, 2, . . . are produced at a clock frame rate of 5 kHz. Stated differently, during each clock frame, which clock frames occur at a 5 kHz rate, one thousand clock numbers 000, 001, . . . 999 are output to the clock highway 14A, to effectively divide each clock frame into one thousand time slots or channels, which time slots or channels occur at a time slot or channel rate of 5 mHz.

As indicated, during each of the one thousand time slots of a clock frame a different clock number is output from the clock generator 18 to the clock highway 14A. Preferably, each clock number takes the form of twelve pulses, divided into three four-bit groups, namely, units, tens and hundreds groups, each group enclosed in binary-coded-decimal (BCD) format. Thus, during time slot 000 of clock frames 1, 2, . . . , the twelve-bit clock number "000" is output to the clock bus 14A in BCD pulse format. Similarly, during time slot 001 of clock frames 1, 2, . . . , the twelve-bit clock number 001 is output from the clock generator 18 to the clock bus 14A in the form of three four-bit pulse groups constituting the number 001 in BCD format. Correspondingly, during time slots 002, 003, . . . 999 of clock frames 1, 2, . . . , the clock numbers 002, 003, . . . 999 are output to the clock bus 14A by the generator 18 in the form of successive twelve-bit pulse groups each of which constitutes a different clock number in BCD format.

Preferably, the clock generator 18 consists of three decade counters of the synchronous (vis-a-vis ripple) type, respectively representing the units, tens, and hundreds digits of the three-digit clock number. The decade counters are connected in cascade with the output of an oscillator constituting the input to the units decade counter. Each decade has four outputs on which appear binary signals representing the decimal digit, in BCD format, stored in that decade counter. The twelve outputs of the three decade counters collectively constitute the twelve-bit BCD clock number. Preferably, the clock highway 14A includes twelve separate, but parallel, signal conductors, each connected to a different one of the twelve outputs of the three decade counters. With such an arrangement, the twelve bits of a clock number are input to the clock highway 14A in parallel-by-bit, serial-by-clock number fashion.

As noted earlier, in the preferred embodiment there are one thousand information sources 12-000, 12-001, . . . 12-999. As also noted, each clock frame 1, 2, . . . is divided into one thousand time slots or time channels 000, 001, . . . 999. In a manner to be described, each of the information sources 12-000, 12-001, . . . 12-999 is uniquely associated with and identified by a different one of the clock numbers 000, 001, . . . 999 occurring during time slots 000, 001, . . . 999 generated each clock frame. In a manner to be described, it is possible for each student station 10-1, 10-2, . . . **10-*n* to selectively obtain audio information via the audio highways 14-0, 14-1, . . . 14-9 from each of the information sources 12-000, 12-001, . . . 12-999.**

Student stations 10-1, 10-2, . . . **10-*n* are all identical in structure and operation, and accordingly only student station 10-1 is described in detail. Student station 10-1 includes a keyboard input circuit 20 into which a student enters the three-digit information source identifying, or call, number "000" or "001" or "002" or . . . or "999" corresponding to the information source 12-000 or 12-001 or 12-002 or . . . or 12-999 from which the student desires to obtain information. The keyboard input circuit 20 provides on output line 20A a sequence of binary pulses constituting, in BCD format, the keyboard-entered information source identifier or call number. The BCD source identifier output from the keyboard on line 20A is input to a three-digit (12 bit) register 22 where it is stored until erased in response to receipt of a reset signal on line 24. The reset signal is generated, at the conclusion of a transmission, by the information source 12-000, 12-001, . . . 12-999 called by that student station and whose information source identifier was previously input to the keyboard circuit 20.**

The student station 10-1 also includes a three-digit (12 bit) comparator 26 which sequentially compares the one-thousand three-digit clock members 000, 001, . . . 999 issued each clock frame input to the comparator from clock bus 14A, with the keyboard-entered information source identifier or call number stored in register 22. The comparison is made on a digit-by-digit basis in that the comparator compares the units, tens and hundreds digits of the clock numbers 000, 001, . . . 999 with the units, tens and hundreds digits of the stored source identifier or call number entered into the keyboard 20. When the units, tens and hundreds digits of a clock number present on clock highway 14A compare with the units, tens and hundreds digits, respectively, of the keyboard-entered information source identifier stored in register 22, output pulses are provided on comparator output lines 26U, 26T and 26H, respectively. A three-input AND gate 28 responsive to all three comparator outputs on line 26U, 26T and 26H provides an output pulse on line 28A to indicate that the units, tens and hundreds digits of the keyboard-entered information source identifier stored in register 22 are identical to the units, tens and hundreds digits of the clock number present on clock highway 14A.

For example, if it is desired to obtain at student station 10-1 information from source 12-137, the source identifier or call number digits 1, 3 and 7 are entered into the keyboard 20 and are thereafter stored in BCD format in the register 22. During the time slot when clock number 137 on clock highway 14A is received at station 10-1, an output will be produced on line 28A. Thus, an output is produced on line 28A at station 10-1 during the time slot 000, 001, . . . 999 associated with the information source 12-000, 12-001, . . . 12-999 whose identifier or call number has been entered into the keyboard 20 by the student. This output on line 28A is fed to a demand pulse generator 30 which provides on its output line 30A a demand pulse which is input to the demand return highway 14D. The demand pulse on line 30A is produced substantially coincidentally with the input to the demand pulse generator on line 28A. Thus, if information source identifier or call number 137 is input to the keyboard 20, producing an output on line 20A coincident with the input to comparator 26 of clock number 137 on clock highway 14A, a demand pulse will be produced on line 30A substantially coincident with the input of clock number 137 from clock highway 14A to the comparator 26 of student station 10-1.

The demand pulse on line 30A which is input to the demand return highway 14D is transmitted down this highway to the demand delay circuit 16 where it is stored until the start of the next clock number issued by clock generator 18 on clock bus 14A. At the start of the next clock number issued by clock generator 18 following receipt at demand delay circuit 16 of the demand pulse generated by student station 10-1 coincident with receipt at that student station of clock number 137, the demand pulse is released to the demand highway 14E and is therefore in synchronism with the clock number being issued at that time by the clock generator. Thus, the demand pulse previously generated by student station 10-1 on line 30A to call source 137 is transmitted down the demand highway 14E in synchronism with a clock number generated by clock generator 18 which is being transmitted down the clock highway 14A. For reasons to become apparent hereafter, the demand pulse for a specified source, such as source 12-137, is released by the demand delay circuit 16 coincident with the start of a predetermined clock number from clock generator 18, which predetermined clock number exceeds the number of the source being called by an amount equal to the sum of (a) the number of time slots it takes a signal to be transmitted along the demand return highway and the demand highway, and (b) the delay of the demand delay circuit. Thus, if it takes a demand signal four time slots to propagate from student station 10-1 along the entire length of the demand return highway 14D and thereafter along the entire length of the demand highway 14E to information source 12-999, the demand pulse generated by student station 10-1 on line 30A coincident with the receipt at student station 10-1 of clock number 137 will be released by the demand delay 16 onto demand highway 14E coincident with the start of issuance by clock generator 18 of clock number 141. The demand signal generated by student station 10-1 coincident with receipt at that student station of clock number 137, which is thereafter released by demand delay circuit 16 coincident with the issuance of clock number 141 by clock generator 18, propagates down the demand highway 14E in synchronism with the propagation down the clock highway 14A of clock number 141.

In a manner to become apparent hereafter, and assuming student station 10-1 has called information source 12-137, information source 12-137 samples the demand highway 14E coincident with receipt at information source 12-137 of clock number 141 present on the clock highway 14A. Because there is a demand pulse present on the demand highway 14E when information source 137 samples the demand highway coincident with receipt at information source 12-137 of clock number 141 present on clock bus 14A, information source 12-137 recognizes that at least one of the student stations desires information whereupon it starts transmitting information samples on its respectively associated audio highway, in this case audio highway 14-1. The information sample transmission rate from called source 12-137 is at the rate of ten information samples per clock frame, and will occur upon receipt at information source 12-137 of clock numbers 037, 137, 237, 337, 437, 537, 637, 737, 837, 937, . . . Since the information samples from called source 12-137 occur at a rate of ten samples per clock frame, and since the clock frame rate is 5 kHz, the information sample rate is 50 kHz. Such an information sampling rate satisfies the Nyquist Theorem in that it exceeds that necessary to avoid loss of information when the sampled information is in the audio frequency range of up to, for example, 20 kHz.

The student station 10-1 also includes an audio highway sample circuit in the form of an AND gate 32 having its two inputs connected to the units output 26U and the tens output 26T of comparator 26. Audio highway sample gate 32 provides outputs on line 32A at the rate of ten per clock frame (50 kHz) coincident with receipt at student station 10-1 of clock numbers 037, 137, 237, 337, 437, 537, 637, 737, 837, 937, . . . The sample pulses on line 32A are input to a sample and hold circuit 34 whose other input on line 36 is connected to the particular one of the ten audio highways on which the called source 12-137 is transmitting information, namely, audio highway 14-1. Connection of sample and hold circuit audio input line 36 to the particular audio highway on which the called source 12-137 is transmitting is accomplished by an audio highway selector circuit 38 which is connected to the hundreds digit storage position of the register 22 via line 38A. The audio highway selector 38 functions in a manner such that line 36 is connected to audio highway buses 14-0, 14-1, . . . 14-9 when the hundreds digit stored in the register 22 is a 0, 1, . . . 9, respectively.

With the sample and hold circuit input line 36 connected to the audio highway 14-1 on which the called station 12-137 is transmitting at clock times 037, 137, . . . 937, and with audio information sample pulses being input to the sample and hold circuit on line 32A at clock times 037, 137, . . . 937, audio information samples from called source 12-137 will be present on sample and hold circuit output line 34A. These audio information samples are fed to a low pass filter and amplifier 42 which, after suitable amplification and filtering, are input on line 42A to a set of headphones 44 wherein the sampled audio information transmitted by called source 12-137 is audibly reproduced at the student operating station 10-1, whereat a student previously entered into the keyboard 20 the number 137 identifying source 12-137 from which information was desired.

The student station 10-1 will continue to receive sampled information from called station 12-137 until either the student station is turned off by suitable means (not shown), or a different information source identifying number is entered into the keyboard 20, or until all the information at the called source 12-137 has been transmitted, whereupon a reset signal is issued by source 12-137 on the reset highway 14B coincident with the receipt thereat of clock number 137 on highway 14A. This reset signal issued by source 12-137 coincident with receipt at the source of clock number 137 propagates down the reset highway 14B in synchronism with the propagation of clock number 137 down the clock highway 14A. Upon arrival of clock number 137 at student station 10-1, an input is provided to a reset sample AND gate 46 on line 28A which is effective to sample the reset highway 14B. Since the reset signal issued by source 12-137 coincident with the presence of clock number 137 at that information source has now arrived at student station 10-1, the result of the reset highway sampling operation is to produce an output on reset line 24 to the register 22 of student station 10-1, resetting this register. With register 22 reset, there is no source identifying number input to the comparator 26 on line 22A, and therefore no signal can be output on line 28A, in turn precluding generation of a demand signal by the demand pulse generator 30. In the absence of a demand pulse output from student station 10-1 on line 30A, no calling of an information source 12-000, . . . 12-999 by student station 10-1 can occur. Additionally, in the absence of an input on line 22A to the comparator 26 of student station 10-1, audio sample signals are not present on line 32A and no sampling of audio information on highways 14-0, 14-1, . . . 14-9 occurs, and hence no information is input to the headphones 44 of student station 10-1.

In certain instances it is desired that only a single student station be permitted to obtain information from the specified information source at any given point in time. To accomplish this, the student station 10-1 is provided with an AND gate 48, one input of which is connected to the seizure highway 14C and the other input of which is connected to line 28A on which appears a pulse coincident with receipt at student station 10-1 of the clock number corresponding to the information source identifier netered into the keyboard 20 by the student. AND gate 48 provides on its output line 48A a seizure signal coincident with receipt at the student station 10-1 of the clock number corresponding to the information source entered into keyboard 20, if that information source had previously been called by another student and is now in use. Thus, if student station 10-1 has called information source 12-137 and this information source is already in use, information source 12-137 is issuing to the seizure highway 14C a "single seizure" signal coincident with receipt at information source 12-137 of clock number 137. This "single seizure" signal output from source 12-137 is then sampled by AND gate 48 at student station 10-1 upon receipt thereat of clock number 137 to provide an output signal on line 48A in the form of a pulse which is input to an "add-1 count" circuit 50. The "add-1 count" circuit 50 provides on its output line 50A, when clock number 137 reaches station 10-1, a signal to the register 20 to increment the number in the register 20 by one unit. Thus, if student station 10-1 has entered into its keyboard 20 source identifier number 137, and source 12-137 is already in use, the number stored in register 22 of student station 10-1 is incremented to a count of 138, preventing student station 10-1 from obtaining information from called source 12-137 which, as indicated, is presumed to already be in use as a consequence of having previously been called by another student station. This process of sampling the single seizure highway 14C and incrementing the student register 22 at station 10-1 will continue at the rate of one unit count per clock frame until the student register reaches a count corresponding to that of the first available source station, whereupon the register will stop incrementing and the student station 10-1 will begin to receive data from that source. By "first available source" is meant the next highest number source which is either (a) already not transmitting, if of the single-seizure type, or (b) is transmitting, or is not transmitting, if not of the single-seizure type.

The add-1 count circuit 50, which responds to the output on line 48A from AND gate 48 present when the called station is in operation, is enabled, subsequent to entry into keyboard 20 of the source identifier number, for an interval less than one clock frame. In this way, the add-1 circuit 50 does not respond to the seizure signal on highway 14C gated to it on line 48A via the AND gate 48 when such seizure signal is attributable to the fact that student station 10-1 has successfully called source 12-137 (not heretofore in use) and set into sequence those operations at the called source which produce the seizure signal on highway 14C in time slot 137. Thus, by enabling the add-1 circuit 50 for an interval less than a time frame following entry of an identifier into keyboard 20, the student station can respond to a seizure signal in time slot 137 on the seizure highway 14C and increment its register 22 if the called station 12-137 is already in use, but will not respond to a seizure signal from called source 12-137 if such has been generated (as a consequence of being called by student station 10-1) for the purpose of preventing other student stations from effectively obtaining information from the source 12-137 called by student station 10-1. To enable the add-1 circuit 50 for the limited duration interval noted subsequent to entry into keyboard 20 of a source identifier number, a time delay circuit 52 is provided. Time delay circuit 52 is responsive to the signal on line 20B from the keyboard circuit 20 which is present upon completion of the entry of a source identifier into the keyboard, and provides on its output line 52A a signal to the add-1 circuit 50 to disable it following the requisite delay after completion of the entry of the source identifier in keyboard 20, which delay is less than one clock frame in length.

The information sources 12-000, 12-001, . . . 12-999 are identical in structure and operation and accordingly only one such information source, namely, information source 12-137 is described in detail. Information source 12-137, considered in more detail, includes a three-digit source identifier register 60 into which is entered for storage, by suitable means not shown, the identifying number to be ascribed to the source. If, for example, the source 12-137 is to be identified by the call number 137, the register 60 stores in the three-digit storage positions thereof the digits 1, 3, and 7, as shown. The information source 12-137 further includes a three-digit comparator 62 which sequentially compares the clock numbers input thereto from the clock highway 14A with the source identifier input on line 60A from register 60.

The comparator 62 is divided into three comparison stages, namely, units, tens and hundreds comparison stages, which respectively compare the units, tens and hundreds digits of successive clock numbers on highway 14A with the units, tens and hundreds digits of the source identifier stored in register 60. When the units, tens and hundreds digits of a clock number on highway 14A at source 12-137 compare with the units, tens and hundreds digits of the source identifier stored in register 60, outputs in the form of pulses are provided on comparator output lines 62U, 62T, and 62H, respectively. An AND gate 64 responsive to the comparator output line 62U, 62T and 62H provides an output pulse on line 64A when the clock number from highway 14A input to comparator 62 of source 12-137 is identical to the source identifier stored in register 60. Thus, an output is provided by AND gate 64 on line 64A when clock number 137 on highway 14A is input to source 12-137.

The pulse output on line 64A is input to a delay circuit 66 producing on delay circuit output line 66A an output pulse following a delay equal to the sum of the propagation delay of the clock highway 14A between the clock generator 18 and the first student station 10-1 and the propagation delay along the demand return highway 14D from the first student station 10-1 to the demand delay circuit 16. In the illustrative example given previously in connection with the description of the demand delay circuit 16, it was assumed that the combined propagation delays from the clock generator 16 to the first student station 10-1 along the clock highway 14A and propagation delay from the first student station 10-1 along the demand return highway 14D to the storage delay circuit 16 was between three and four time slots in duration. Under such assumption, the delay introduced by circuit 66 will be equal to four time slots. (Were the combined propagation delays equal to between one and two time slots in duration, the delay of citcuit 66 would be two time slots.) Thus, the output from the delay circuit 66 on line 66A, as a consequence of the input thereto on line 64A occurring when clock number 137 is received by source 12-137, is provided on line 66A coincident with receipt of clock number 141 at source 12-137.

The output on line 66A occurring coincident with receipt of clock number 141 at source 12-137 is input to an AND gate 68 whose other input is connected to the demand highway 14E. AND gate 68 when strobed by the pulse output on line 66A occurring coincident with receipt of clock number 141 at source 12–137 functions to sample the demand highway 14E coincident with receipt of clock number 141 at source 12-137. If any one of the student stations **10-1, 10-2, . . . 10-*n* has entered into tis respective keyboard 20 the source identifier number 137, a demand signal will be present on demand highway 14E and will arrive at source 12-137 coincident with receipt at source 137 of clock number 141. Thus, when AND gate 68 is strobed by the output on line 66A coincident with receipt of clock number 141 at source 12-137, and assuming at least one of the stations has dialed source 12-137, an output pulse will be provided on line 68B coincident in time with receipt at source 12-137 of clock number 141.**

The pulse output on line 68B from AND gate 68 is input to a monostable multivibrator 70 which in response thereto is switched to provide on its output line 70A a start signal which is input to information or data source 72, such as a tape recorder storing audio information, resulting in energization of the data source 72. The period of the monostable multivibrator 70 is in excess of the duration of one clock frame, preferably approximately 1.5 clock frames in length. If, during the next successive clock frame, sampling of demand highway 14E by AND gate 68 does not produce an output on line 68B, the monostable multivibrator 70 will reset, terminating the start signal on line 70A which in turn terminates operation of the data source 72, causing the data source to reset or rewind to its start position. If, however, during the clock frame succeeding that in which the monostable multivibrator 70 was first switched to its set state to start the data source 72, sampling by AND gate 68 of the demand highway 14E does produce an output on line 68B indicating that one of the student stations still desires to obtain information from data source 72, the monostable multivibrator 70 will not be reset, but rather will remain in its set condition for another time interval equal to approximately 1.5 clock frames in length, with the result that the data source 72 will continue to remain energized. The data source 72 of source 121137 remains energized so long as sampling of demand highway 14E and AND gate 68 of source 12-137 results in the application of a demand signal to the monostable multivibrator 70 via line 68B.

The information source 12-137 also includes an audio sampling AND gate 74, the two inputs of which are connected to the units and tens output line 62U and 62T of comparator 62. AND gate 74 provides on its output line 74A sampling pulses coincident with a receipt at source 12-137 of clock numbers 037, 137, . . . 937 . . . The sampling pulses on line 74A, which occur at the rate of ten sampling pulses per clock frame, are input to a sampling gate 76, the other input of which is connected to the output of data source 72 on line 72A. Sampling gate 76 provides on its output line 76A to its respectively associated audio highway 14-1 samples of the audio information provided by data source 72 at time slots coincident with receipt at information source 12-137 of clock numbers 037, 137, 237, . . . 937, . . . It is these gated samples from data source 72 of source 12-137 which are subsequently sampled by the sample and hold circuit 34 of the student station, for reproduction by headphones 44 thereof, at the student station, e.g. station 10-1, which has called the source 12-137.

Since the clock highway 14A and the audio highways 14-0, 14–1, . . . 14-9 follow substantially identical paths from the sources 12 to the student stations 10, the data source samples gated by source 12-137 onto audio highway 14-1 in response to receipt at source 12-137 of clock signals 37, 137, 237, . . . 937 will remain synchronized with these clock signals as they travel down the audio highways to the student stations which are located in spaced sequence along the highway. Thus, if student station 10-1 called source 12-137, the data samples from source 12–137 output on audio highway 14-1, coincident with receipt at source 12–137 of clock numbers 037, 137, . . . 937, would be input to student station 10-1 upon receipt at student station 10-1 of clock signals 037, 137, . . . 937. Similarly, had student station 10-n called source 12-137, the audio samples output therefrom on audio bus 14-1, coincident with receipt at source 12-137 of clock numbers 037, 137, . . . 937, would be sampled at student station 10-n upon receipt thereat of clock numbers 037, 137, . . . 937. Of course, since there is a finite propagation delay along the audio and clock highways 14-1 and 14A between student station 10-1 and the last student station 10-*n*, the sampled data from called source 12-137 would be reproduced at the last student station 10-n subsequent to the time when it would be reproduced at student station 10-1 by an amount equal to the propagation delay between student station 10-1 and student station 10-*n*.

The information source 12-137 includes a further delay circuit 78. Delay circuit 78 is responsive to the start signal on output line 70A of the monostable multivibrator 70 which is present so long as there is a demand for source 12-137 each clock frame. The delay introduced by delay circuit 78 to the start signals on output line 70A from multivibrator 70 is less than one clock frame in length, but in excess of the delay of student station delay circuit 52 which operates to retard disablement of the add-1 circuit 50 until the student station has had an opportunity to effectively sample the seizure highway 14C to determine whether the called source is already in use. With the delay of circuit 78 of the magnitude indicated, the start signal on output line 70A will be applied on output line 78A as one input to a seizure AND gate 80 slightly less than one clock frame after the sampled demand signal received at source 12-137 has switched the monostable multivibrator 70 to start the data source 72. This input to seizure AND gate 80 on line 78A remains so long as there is a demand for source 12-137.

AND gate 80 is also responsive to the output line 64A of AND gate 64 on which there is a pulse once per clock frame coincident with receipt at source 12-137 of the clock number associated with the source identified in register 60, namely, coincident with receipt at source 12-137 of clock number 137. AND gate 80 is also responsive to line 82. Line 82 is selectively connectable, via a switch 84 to a signal source 86. When switch 84 is in the closed position shown connecting source 86 and line 82, a signal level is input to AND gate 80 indicating that source 12-137 is of the "single seizure" type, that is, is of the type which is to transmit information to only a single student station at a time. If switch 84 is open, source 12–137 can be used to simultaneously transmit information to multiple student stations.

Assuming that source 12-137 is of the single seizure type, that is, is designed to be capable of providing information to only one student station at any given time, switch 84 will be in the closed position and a signal level will be input to AND gate 80 on line 82. As a consequence, starting with the output from AND gate 64 in the time frame following receipt of the first demand signal at source 12-137 and start of the data source 72, an output will be provided on AND gate output line 80A to the single seizure highway 14C coincident with receipt at information source 12-137 of clock number 137. It is this output on line 80A to the single seizure highway 14C which is sampled by the single seizure AND gate 48 of a student station calling source 12-137 while such source is already in use by another student station. Since the single seizure highway 14C and the clock highway 14A follow substantially identical paths, the single seizure pulse output to seizure highway 14C on line 80A from source 12-137 coincident with receipt at that source of clock number 137 will remain in snychronism as it travels down the single seizure highway with clock number 137 as the latter travels down the clock highway. As a consequence of the synchronous travel of clock number 137 and the single seizure output on line 80A from source 12-137, any student station calling source 12-137 when source 12-137 is already in use will, upon arrival at said other student station of clock number 137, sample the seizure highway with its respective AND gate 48 to produce an output on its line 48A to its respective add-1 count circuit 50 to, in turn, increment its respective register 22, thereby preventing such second-to-call student station from sampling the appropriate audio highway 14-1 coincident with receipt thereat of clock numbers 037, 137, . . . 937 (except during the first clock frame after initiating the call to station 12-137).

The information source 12-137 also includes a reset AND gate 81 which is responsive to the pulse output on line 64A occurring each clock frame coincident with receipt at source 12-137 of clock number 137, and a line 83 output from the data source 72 on which appears a reset signal when the data source 72 has transmitted its entire store of audio information. if the audio information of source 72 is stored on a pre-recorded magnetic tape, the reset signal can be prerecorded on the tape at the end thereof, with a signal duration at least one clock frame in length. AND gate 81 provides on its output line 81A a pulse coincident with receipt at source 12-137 of clock number 137 providing, of course, that the data source has completed its transmission and provided a reset signal on line 83. The reset pulse appearing on line 81A is input to the reset highway 14B coincident with receipt at source 12-137 of clock number 137. Since the reset highway and the clock highway follow substantially identical paths to the student stations, the reset signal on line 81A which is produced in synchronism with receipt at source 12-137 of clock number 137 will travel down the reset highway in synchronism with propagation of clock number 137 down clock highway 14A. Upon arrival at any student station which has been receiving information from source 12-137 of clock number 137, the reset AND gate 46 of that student station will sample the reset highway 14B and detect the presence of the reset signal generated by source 12-137 which has arrived at the student station coincident with the clock number 137, with the result that an output will be produced from AND gate output line 24 of the student station to reset the register 22 into which the identifying number of source 137 was entered by the student.

If it is desired that the data source 72 be capable of providing audio information to more than one student station simultaneously, switch 84 is left in the open position. This prevents the application of a single seizure signal to gate 80 via line 82. In the absence of a single seizure signal on line 82, a single seizure pulse will not be output to the single seizure highway 14C via line 80A once per frame coincident with receipt at source 12-137 of clock number 137. In the absence of the application of a single seizure signal to highway 14C from source 12-137, should source 12-137 be transmitting information to a first student station when a second student station calls source 12-137, the add-1 count circuit 50 of this second student station would not increment the count in its register 22, with the result that a second student station calling source 12-137 while a first student station (which has previously called source 12-137) is receiving audio information will be able to also receive the audio information by sampling of the appropriate audio highway 14-0, 14-1, . . . 14-9 upon receipt thereat of clock number 137.

Figure 2:
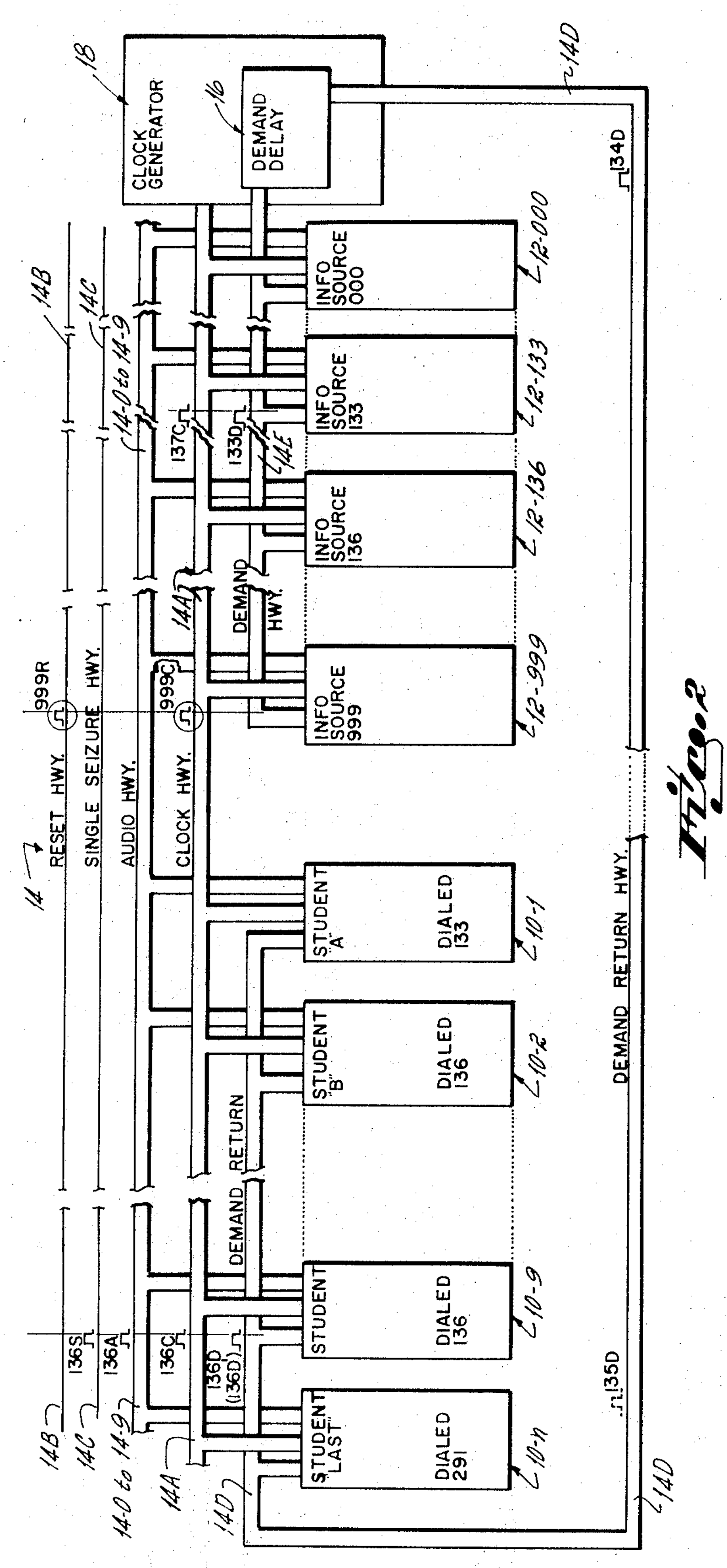
FIG. 2 is a schematic circuit diagram of the system showing the signals present, and their location on the highways, at a given instant of time.

For a more clear understanding of the overall flow of signals through the system depicted in FIG. 1, reference is made to FIG. 2 which depicts the overall arrangement of the sources 12-000, 12-001, . . . 12-999, the student stations 10-1, 10-2, . . . 10-n, and the network of interconnecting highways 14A, 14B, 14C, 14D, 14E, and 14-0 through 14-9. Also shown in FIG. 2 is the clock generator 18 and the demand delay circuit 16. In practice, the clock highway 14A, reset highway 14B, single seizure highway 14C, and audio highways 14-0 through 14-9 follow substantially identical physical paths such that the propagation delays for each of these highways from any given first point to any given second point, such as from source 12-000 to student station 10-*n*, are identical. In this way, a reset signal generated by source 12-000 coincident with receipt at source 12-000 of clock number 000 will propagate down the reset highway 14B toward the student stations 10 in synchronism with the propagation of clock signal 000 down the clock highway 14A to the student station, with the result that the reset signal from source 12-000 will arrive at successive student stations 10-1, 10-2, . . . 10-*n* in synchronism with the arrival of clock number 000 at the successive student stations 10-1, 10-2, . . . 10-*n*, respectively.

In a similar manner, single seizure signals on highway 14C will propagate down the single seizure highway 14C in synchronism with the associated clock number signals on clock highway 14A. Thus, a single seizure signal generated by source 12-999 coincident with receipt at this source of clock number 999 will propagate down the single seizure highway 14C to the student stations 10-1, 10-2, . . . 10-*n* in synchronism with the propagation down the clock highway 14A of the clock number 999, with the result that the single seizure signal produced by source 12-999 and clock signal 999 will arrive in synchronism at the successive student station 10-1, 10-2, . . . 10-*n*. Likewise, audio sample signals output on audio highway 14-1 from source 12-137 coincident with the arrival at source 12-137 of clock number signals 037, 137, 237, . . . 937 will propagate down the audio highway in synchronism with their associated clock number signals 037, 137, . . . 937 such that audio sample signals from source 137 will arrive at the successuv.e student stations in synchronism with the respectively associated clock number which coincided with their generation at the source 12-137.

Additionally, the demand highway 14E follows substantially the same physical path as that portion of the clock highway 14A located between clock generator 18 and the last source 12-999 in the series of sources, while that portion of the demand return highway 14D between student stations 10-1 and 10-*n* follows substantially the same physical path as the corresponding portion of the clock highway 14A between student station 10-1 and student station 10-*n*. In this manner, demand signals generated by student stations 10-1, 10-2, . . . 10-*n* will travel down a portion of the demand return highway connected between the first and last student stations 10-1 and 10-*n* in synchronism with the associated clock signal on highway 14A which arrive at the student stations coincident with the generation of the demand signal. Thus, a demand signal generated by student station 10-2 for source 136 will travel down the demand return highway 14D toward the last student station 10-*n* in synchronism with clock number signal 136 which was received at student station 10-2 coincident with generation of the demand by this station for source 136. In similar fashion, a demand signal released from demand delay circuit 16 at the start of a clock number signal from generator 18 will travel down the demand highway 14E in synchronism with the clock number signal on highway 14A which was issued by the clock generator at the time the demand signal was released by the demand delay circuit 16.

As noted earlier, the delay circuit 66 of the information sources 12-000, 12-001, 12-002, . . . 12-999 delays the sampling of the demand highway 14E by the respective source AND gate 68, following receipt at the respective source of the clock number corresponding to the three-digit identifier of that source, by an interval equal to the propagation delay of the entire demand return highway 14D and that portion of the clock highway connected between clock generator 18 and the last source 12-999, which latter propagation delay is also equal to the propagation delay of the entire length of the demand highway 14E. With reference to FIG. 2, and assuming the delay introduced by circuit 66 of the sources 12-000 through 12-999 is less than the duration of four time slots but more than the duration of three time slots, which duration interval equals the summation of the propagation delays of the demand return highway 14D and the demand highway 14E, a description of the operation of the system insofar as the demand function is concerned will now be made.

Specifically, FIG. 2 is an instantaneous schematic representation depicting the signals present in the system at some specific instant of time after the system has been in operation for some unknown period. As represented by pulses identified as 137C and 136C, it can be seen that the clock generator 18 has applied to clock line 14A clock number 137 which is now located at the source 12-133, clock number 136 having been issued during the previous time slot and propagated down the clock highway 14A until it is now opposite student station 10-9. Student station 10-2 is dialed to source 12-136. As a consequence, when clock pulse 136C arrived at student station 10-2, a demand pulse 136D was generated thereat on line 30A of station 10-2 and applied to the demand return highway 14D. This demand pulse 136D has moved down demand return highway 14D in synchronism with the clock number pulse 136C on clock highway 14A and is now opposite student station 10-9. Additionally, student station 10-9 which is also dialed to source 12-136 has generated a demand pulse 136D′ on its line 30A which is also input to the demand return highway 14D. The demand pulse 136D′ generated by student station 10-9 is applied to the demand highway 14D synchronously with the arrival at student station 10-9 of the demand pulse 136D previously generated by student station 10-2 when clock number 136 was received at that student station. Thus, demand pulses 136D and 136D′ will travel down the demand return highway 14D and be released by the delay circuit 16 to the demand highway 14E in synchronism, arriving at successive sources 12-000, . . . 12-999 in synchronism.

With referrence to the demand return highway 14D, particularly the pulse identified with reference numeral 134d, it is apparent that some student station (not shown) has dialed source 12-134, but that no student has dialed source 135 inasmuch as a demand pulse is not present on the demand highway midway between demand pulse 134D and demand pulses 136D and 136D′. Had some student dialed source 12-134, a demand pulse would appear on the demand highway 14D as indicated by the nonexistent demand pulse 135D (shown in dotted lines) located between existing pulses 134D and 136D.

Also note that student 10-1 who has dialed source 133 generated a demand pulse four time slots earlier than the time slot when clock number 137 was issued by clock generator 18, as evidenced by the demand pulse 133D present on demand highway 14E which was released from the demand delay circuit 16 in synchronism with the application to the clock highway of the clock number pulse 137C. Demand pulse 133D will arrive at source 12-133 in synchronism with the arrival at this source of clock number pulse 137C, that is, demand pulse 133D will arrive at source 12-133 exactly four time slots after the arrival at this source of clock pulse 133 (not shown). However, since sampling of the demand highway 14E by the AND gate 68 of source 12-133 is delayed four time slots after the arrival thereat of pulse number 133 (not shown), demand pulse 133D will arrive at source 12-133 at precisely the correct time to be sampled by the AND gate 68 of this source which, as described earlier, will result in the switching of the start multivibrator 70 and the initiation of an information transmission.

With reference to audio highway 14-1, note that sampled audio signal 136A transmitted by dialed source 12-136 coincident with receipt at that source of clock number 136C is in synchronism with clock signal 136C and has arrived at student station 10-9 to be sampled by that station, which station has dialed source 12-136 and is continuing to issue demand pulses 136D on its output line 30A.

Assuming student 10-2 has dialed source 12-136 subsequent to the dialing of this source by student 10-9 and that this source is of the single seizure type, the single seizure pulse 136S output on seizure highway 14C by source 12-136 will, after it propagates from source 12–136 to student station 10-2 and is sampled thereat, results in incrementing the count in register 22 thereof such that student station 10-2 will not be able to receive information from source 12-136. As noted, the foregoing assumes that source 12-136 is a "single seizure" source, that is, that its respective switch 84 is in the closed position to apply a single seizure signal to line 82. If source 12-136 is not a single seizure source, tht is, if switch 84 thereof is in the open position, source 136 is capable of providing audio information to multiple student stations at the same time. Under these circumstances, the single seizure pulse 136S, shown on highway 14C of FIG. 2, will not be present and both student station 10-2 and student station 10-9 will sample the audio highway 14-1 at the appropriate ten time slots of each clock frame and receive the ten samples of audio information 136A (one shown) transmitted by source 12-136 each clock frame.

Finally, note that audio information pulse 136A, which will soon arrive opposite student station **10-*n* will not be sampled by this student station since this student station has dialed source 291. As a consequence, the arrival at student station 10-*n* of clock pulse 136C will not cause the audio highway 14-1 to be sampled by station 10-*n* coincident with the arrival thereat of sampled data signal 136A. However, student station 10-*n* which has dialed source 12-291 will sample audio highway 14-2 when clock number signals 91, 191, 291, . . . 991 (not shown) reach station 10-n to detect audio signals (not shown) transmitted by source 12-291 when clock number signals 91, 191, 291, . . . 991 were at source 12-291. It should be clear that different student stations, e.g., 10-2 and 10-*n*, can concurrently call and receive information from different sources, e.g., 12-136 and 12-291; as well as that different student stations, e.g., 10-2 and 10-9, can concurrently call and receive information from the same source, e.g., 12-136**, providing the source is not of the single seizure type.

Assuming source 12-999 were transmitting audio information, and further that such transmission has now just been completed, upon arrival of clock pulse number 999C (shown encircled) at source 12-999, the reset signal (shown encircled) on reset highway 14B and identified with the reference numeral 999R, would be issued. This reset signal 999R would propagate down the reset highway in synchronism with the associated clock signal 999C. Upon arrival of clock signal 999C at a student station (not shown) which has dialed source 999 and is receiving a transmission from it, that student station would sample the reset highway as an incident to arrival of clock pulse 999C thereat. This reset highway sampling operation at the student station in question would detect the presence of reset pulse 999R, causing this student station to reset its storage register 22, in turn terminating the issuance of demand signals for source 12-999 coincident with the arrival at that student station of clock number 999C. Since FIG. 2 is a schematic of system signal at a given instant, namely, when clock signals 136C and 137C are on the clock highway 14A, it should be understood that clock and reset signals 999C and 999R shown encircled in FIG. 2 could not in reality exist in the system at the same instant as clock signals 133C–137C since the total system propagation delay is presumed to be only four time slots.

What is claimed is:

1. A time-division multiplex communication system comprising:

at least first and second receiving stations, at least first and second transmitting stations, a data highway interconnecting said receiving and transmitting stations, a calling highway interconnecting said receiving and transmitting stations, a clock number highway interconnecting said receiving and transmitting stations, a clock number generator for sequentially generating at least first and second different clock number signals per clock frame, said clock generator being connected to apply said clock signals to said clock highway, first and second recognition means included in said first and second receiving stations, respectively, for recognizing receipt at said first and second receiving stations, respectively, of said first and second clock number signals, first and second calling means included in said first and second receiving means, respectively, responsive to said first and second recognition means, respectively, for generating first and second demand signals in response to recognition by said first and second recognition means of said first and second clock number signals, said first and second calling means being connected to said calling highway to apply said first and second demand signals thereto in a specified timed relation to receipt at said first and second receiving station of said first and second clock number signals, respectively, first and second identifier means included in said first and second transmitting stations, respectively, for recognizing receipt at said first and second transmitting stations, respectively, of said first and second clock signals, respectively, and in response thereto generating first and second outputs, respectively, first and second calling highway sampling means included in said transmitting stations, respectively, and responsive to said first and second outputs of said first and second identifier means, respectively, for sampling said calling highway in a specified timed relation to receipt at said first and second transmitting stations of said first and second clock number signals, respectively, to detect receipt at said first and second receiving stations of said first and second demand signals, respectively, first and second data sources at said first and second transmitting stations responsive to said first and second calling highway sampling means, respectively, for generating first and second data in response to detection of a demand signal by said first and second call highway sampling means, first and second data gating means at said first and second transmitting stations for gating data to said data highway, generated by said first and second data sources, in specified timed relation to receipt at said first and second transmitting stations of said first and second clock signals, and first and second data sampling means at said first and second receiving stations responsive to said first and second recognition means for sampling said data highway in predetermined timed relation to receipt at said first and second receiving means of said first and second clock number signals, respectively, said data, calling and clock highways follow substantially the same physical path to maintain synchronism between propagation of a specified clock number signal along said clock highway and the propagation of demand and data signals associated with said specified clock number signal.

2. The system of claim 1 wherein:

said first and second identifier means are selectively changeable to facilitate recognition of said second and first clock number signals, respectively, and wherein said first and second calling highway sampling means sample said calling highway at said specified timed relation to receipt thereat of said second and first clock number signals to detect said second and first demand signals, and wherein said first and second data gating means gate data generated by said first and second data sources in timed relation to receipt at said first and second transmitting stations of said second and first clock number signals, respectively.

3. The system of claim 1 wherein at least said first transmitting station includes reset means to generate a reset signal when said first data source has concluded generation of data, a reset highway interconnecting at least said first receiving station and at least said first transmitting station, means to apply said reset signal to said reset highway in a specified time relation to receipt at said first transmitting station of said first clock number signal, said reset highway follows substantially the same physical path as said clock highway to maintain synchronism between propagation of said first clock number signal along said clock highway and the propagation of reset signals associated with said first clock number signal, reset highway sampling means at said first receiving station for sampling said reset highway in predetermined relation to receipt at said station of said first clock number signal for detecting receipt thereof of said reset signal, and said first recognition means being responsive to said reset highway sampling means for terminating the recognition by said first receiving means of said first clock signals upon detection of a receipt signal at said first receiving means.

4. The system of claim 1 further including a single seizure highway interconnecting at least said first transmitting station and said receiving stations, a single seizure signal generator at said first transmitting station for applying, when said first data source is generating data, a single seizure signal to said single seizure highway in predetermined timed relation to receipt thereat of said first clock number signal, said single seizure highway follows substantially the same physical path as said clock highway to maintain synchronism between propagation of said single seizure signal and the propagation of said first clock number signal, single seizure highway sampling means at said first receiving station for sampling said single seizure highway in predetermined timed relation to receipt thereat of said first clock number signal to detect receipt thereat of said single seizure signal, and means at said first receiving station responsive to said seizure highway sampling means for terminating generation thereat of said first demand signals upon detection thereat of said single seizure signal.

5. A time-division multiplex communication system comprising:

at least one receiving station,

*n* transmitting stations,

*m* data highways each connected to *n*/*m* different transmitting stations, and to said receiving station, a clock number highway interconnecting said receiving and transmitting stations, said *m* data highways and said clock number highway follow substantially the same physical path to maintain synchronism between propagation of a specified clock number along said clock number highway and the propagation of data signals along said *m* data highways associated with said specified clock number, a clock number generator for sequentially generating n different clock number signals per clock frame, said clock generator being connected to apply said clock signals to said clock highway, identifier means included in each transmitting station for recognizing receipt at its transmitting station of a different one of said clock number signals associated with said transmitting station, a data sample source included in each transmitting station for transmitting m samples per clock frame of data having a maximum frequency f in predetermined time relation to receipt thereat of said respectively associated clock number signal, said clock generator generating said clock numbers at a rate correlated to $2fn/m$, whereby data having said maximum frequency $f$ is transmitted without data loss from said *n* transmitters, and data sampling means at said receiving station for sampling one of said data highway m times per clock frame in predetermined time relation to receipt thereat of a specified clock number signal for sampling the m samples per clock frame of data transmitted by the data source associated with said specified clock number signal.

6. The system of claim 5 further comprising:

a calling highway interconnecting said receiving and transmitting stations, means included in said receiving station for recognizing receipt thereat of said specified clock number signal and in response thereto generating a demand signal for application to said calling highway in specified time relation to receipt at said receiving station of said specified clock signal, said calling highway follows substantially the same physical path as said clock highway to maintain synchronism between propagation of said demand signal and the propagation of said specified clock signal, and calling highway sampling means at each of said transmitting stations for sampling said calling highway in predetermined time relation to receipt thereat of the clock number signal respectively associated therewith and in response thereto controlling said data sample source thereat to transmit data samples to said data highway only upon sampling of said demand signal.

7. The system of claim 6 wherein:

at least one of said transmitting stations includes reset means to generate a reset signal when the data source thereat has concluded transmitting data samples, a reset highway interconnecting at least said one transmitting station and said receiving station, means at said one transmitting station to apply said reset signal to said reset highway in specified time relation to receipt at said one transmitting station of the clock number signal associated therewith, said reset highway follows substantially the same physical path as said clock highway to maintain synchronism between propagation of said reset signal and the propagation of said associated clock number, reset highway sampling means at said receiving station for sampling said reset highway in predetermined time relation to receipt thereat of the clock number signal associated with said one transmitting station, and said demand signal generating means at said receiving station including means responsive to said reset highway sampling means for terminating generation of said demand signal when said reset signal has been sampled thereat.

8. The system of claim 1 wherein said calling highway has a specified propagation delay along its length and wherein said first and second calling highway sampling means sample said calling highway following an interval after receipt thereat of said first and second clock number signals, said interval being correlated to said propagation delay.

9. The system of claim 8 wherein said calling highway includes a first section connected to said receiving stations and a second section connected to transmitting stations, said system further including means connected between said calling highway sections and responsive to said clock number generator for releasing to said second calling highway section, in synchronism with the next clock number signal generated by said clock number generator, a demand signal input thereto from said first calling highway section, whereby said released demand signal and said next clock number signal are synchronized.

10. The system of claim 1 wherein said different clock number signals are different sequences of binary signals, and wherein said identifier means at each transmitting station includes a. a source of binary signals unique to said transmitting station, and b. a digital comparator for sequentially comparing said different sequences of binary clock number signals received thereat with said unique binary signals associated with said transmitting station.

11. The system of claim 10 wherein said binary signal sources are selectively variable to facilitate transmitting data from a given transmission station in response to receipt thereat of different clock number signals.

12. A time-division multiplex communication system comprising:

at least first and second receiving stations, at least first and second transmitting stations, a data highway interconnecting said receiving and transmitting stations, a calling highway interconnecting said receiving and transmitting stations, a clock highway interconnecting said receiving and transmitting stations, a clock generator for sequentially generating at least first and second clock signals per clock frame, said clock generator being connected to apply said clock signals to said clock highway, first and second recognition means included in said first and second receiving stations, respectively, for recognizing receipt of said first and second receiving stations, respectively, of said first and second clock signals, first and second calling means included in said first and second receiving means, respectively, responsive to said first and second recognition means, respectively, for generating first and second demand signals in response to recognition by said first and second recognition means of said first and second clock signals, said first and second calling means being connected to said calling highway to apply said first and second demand signals thereto in a specified timed relation to receipt at said first and second receiving station of said first and second clock signals, respectively, first and second identifier means included in said first and second transmitting stations, respectively, for recognizing receipt of said first and second transmitting stations, respectively, of said first and second clock signals, respectively, and in response thereto generating first and second outputs, respectively, first and second calling highway sampling means included in said transmitting stations, respectively, and responsive to said first and second outputs of said first and second identifier means, respectively, for sampling said calling highway in a specified timed relation to receipt at said first and second transmitting stations of said first and second clock signals, respectively, to detect receipt at said first and second receiving stations of said first and second demand signals, respectively, first and second data sources at said first and second transmitting stations responsive to said first and second calling highway sampling means, respectively, for generating first and second data in response to detection of a demand signal by said first and second call highway sampling means, first and second data gating means at said first and second transmitting stations for gating data to said data highway, generated by said first and second data sources, in specified timed relation to receipt at said first and second transmitting stations of said first and second clock signals, and first and second data sampling means at said first and second receiving stations responsive to said first and second recognition means for sampling said data highway in predetermined timed relation to receipt at said first and second receiving means of said first and second clock signals, respectively, said data, calling and clock highways follow substantially the same physical path to maintain synchronism between propagation of a specified clock number signal along said clock highway and the propagation of demand and data signals associated with said specified clock signal.

13. The system of claim 12 wherein at least said first transmitting station includes reset means to generate a reset signal when said first data source has concluded generation of data, a reset highway interconnecting at least said first receiving station and at least said first transmitting station, means to apply said reset signal to said reset highway in a specified time relation to receipt of said first transmitting station of said first clock signal, said reset highway follows substantially the same physical path as said clock highway to maintain synchronism between propagation of said reset signal and the propagation of said first clock signal, reset highway sampling means at said first receiving station for sampling said reset highway in predetermined relation to receipt at said station of said first clock signal for detecting receipt thereof of said reset signal, and said first recognition means being responsive to said reset highway sampling means for terminating the recognition by said first receiving means of said first clock signals upon detection of a receipt signal at said first receiving means.

14. The system of claim 12 further including a single seizure highway interconnecting at least said first transmitting station and said receiving stations, a single seizure signal generator at said first transmitting station for applying, when said first data source is generating data, a single seizure signal to said single seizure highway in predetermined timed relation to receipt thereat of said first clock signal, said signal seizure highway follows substantially the same physical path as said clock highway to maintain synchronism between propagation of said single seizure signal and the propagation of said first clock signal, single seizure highway sampling means at said first receiving station for sampling said single seizure highway in predetermined timed relation to receipt thereat of said first clock signal to detect receipt thereat of said single seizure signal, and means at said first receiving station responsive to said seizure highway sampling means for terminating generation thereat of said first demand signals upon detection thereat of said single seizure signal.

15. A time-division multiplex communication system comprising:

at least a first receiving station, at least first and second transmitting stations, a clock number highway connecting said receiving and transmitting stations, a clock number generator for sequentially generating at least first and second different encoded clock number signals per clock frame, said clock generator being connected to apply said clock signals to said clock highway, a data highway separate from said clock highway and following substantially the same physical path as said clock highway to interconnect said receiving and transmitting stations, first and second identifier means included in said first and second transmitting stations, respectively, for recognizing receipt at said first and second transmitting stations, respectively, of said first and second different encoded clock signals, respectively, and in response thereto generating first and second outputs, respectively, first and second data sources at said first and second transmitting stations operative in response to said first and second outputs, respectively, for transmitting on said data highway first and second data predetermined in time relation response to recognition of said first and second clock signals by said first and second identifier means.

* * * * *

UNITED STATES PATENT OFFICE
CERTIFICATE OF CORRECTION

PATENT NO. : 3,870,825

DATED : March 11, 1975

INVENTOR(S) : Robert C. Roberts et al

It is certified that error appears in the above-identified patent and that said Letters Patent are hereby corrected as shown below:

Column 12, line 48, "tis" should be --its--.

Column 13, line 17, "12-1137" should be --12-137--.

Column 15, line 14, "if" should be --If--.

Column 17, line 63, "12-134" should be --12-135--.

Column 18, line 43, "tht" should be --that--.

Signed and Sealed this

*ninth* Day of *September 1975*

[SEAL]

*Attest:*

RUTH C. MASON
*Attesting Officer*

C. MARSHALL DANN
*Commissioner of Patents and Trademarks*